3,127,417
NEW HYDROXYLATED MONOEPOXYACETALS
Daniel Porret, Basel, and Hans Batzer, Arlesheim, Switzerland, assignors to Ciba Limited, Basel, Switzerland, a company of Switzerland
No Drawing. Filed July 14, 1961, Ser. No. 123,994
Claims priority, application Switzerland July 20, 1960
7 Claims. (Cl. 260—340.7)

The present invention provides new monoepoxides of the formula (I)

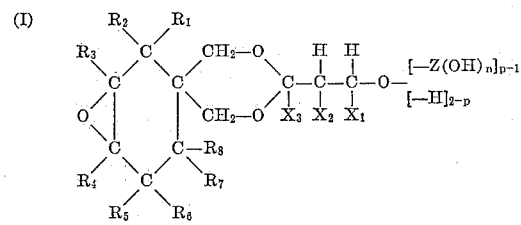

where $R_1$ to $R_8$ each represents a monovalent substituent such as a halogen or hydrogen atom, an alkoxy group or an aliphatic, cycloaliphatic, araliphatic or aromatic hydrocarbon radical, preferably an alkyl group with 1–4 carbon atoms, and in which $R_1$ and $R_5$ together may also constitute an alkylene such as a methylene group; $X_1$ and $X_2$ each represents a hydrogen atom or a methyl group; $X_3$ represents a hydrogen atom or an alkyl group with 1–4 carbon atoms; Z represents the hydrocarbon radical of a polyhydric alcohol; $n$ is a small whole number, preferably 1 to 5, and $p=1$ or 2.

The monoepoxides of the invention are obtained when an unsaturated ether acetal or ketal of the general formula (II)

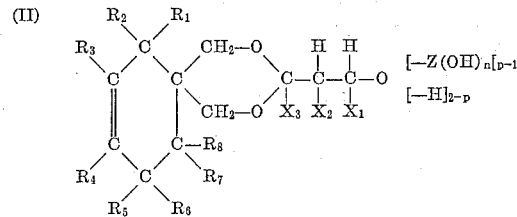

where $R_1$ to $R_8$, $X_1$ to $X_3$, Z, $n$ and $p$ have the same meanings as in the Formula I—is treated with an epoxidizing agent.

The parent materials of the Formula II can be prepared by acetalizing in a first stage an aldehyde or ketone of the formula (III)

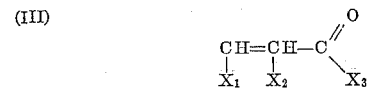

with a dialcohol of the formula (IV)

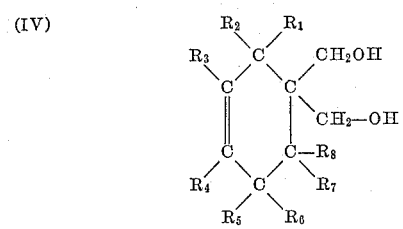

to form an unsaturated acetal or ketal of the general formula (V)

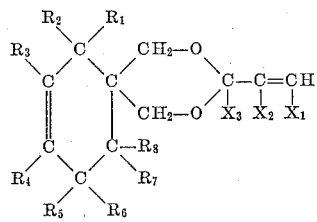

In a second stage either water or a dialcohol or polyalcohol of the formula $Z(OH)_{n+1}$ is added on to the acetal or ketal (V).

As aldehydes of the Formula III there may be mentioned acrolein, methacrolein and crotonaldehyde. As ketones of the Formula III there may be mentioned methylvinyl ketone and ethylvinyl ketone.

As dialcohols (IV) there may be mentioned, for example:

1:1-bis-(hydroxymethyl)-cyclohexene-(3),
1:1-bis-(hydroxymethyl)-6-methyl-cyclohexene-(3),
1:1-bis-(hydroxymethyl)-2:4:6-trimethyl-cyclohexene-(3),
1:1-bis-(hydroxymethyl)-2:5-endomethylene-cyclohexene-(3) and
1:1-bis-(hydroxymethyl)-4-chloro-cyclohexene-(3).

As dialcohols and polyglycols of the formula $$Z(OH)_{n+1}$$

there may be mentioned:
Ethylene glycol, diethylene glycol, triethylene glycol, polyethylene glycol, propylene glycol-1:2, propylene glycol-1:3, polypropylene glycol, butanediol-1:4, 2-methylpentanediol-2:4, pentanediol-1:5, hexanediol-1:6, glycerol, diglycerol, trimethylolethane, 1:1-trimethylolpropane, butanetriol-(1:2:4), hexanetriol-2:4:6, pentaerythritol, erythritol, xylitol, scorbitol, mannitol, dulcitol, talitol, iditol, adonitol, arabitol, heptitol, quinitol, resorcitol, 2:2:6:6-tetramethylol-cyclohexanol-(1); furthermore polyols containing other functional groups, for example sugars such as glucose, galactose, mannose, fructose, cane sugar and the like; sugar acids such as glucuronic acid, galacturonic acid, mucic acid and the like.

The acetalization and ketalization respectively may follow the usual pattern and consist, for example, in heating the aldehyde or ketone of the Formula III together with the diol (IV) in the presence of an acidic catalyst such, for example, as sulfuric, phosphoric or para-toluenesulfonic acid.

The addition of water or of the polyalcohol $$Z(OH)_{n+1}$$

on to the carbon-to-carbon double bond in the aldehyde radical of the acetal (V) is advantageously performed in known manner in the presence of a basic catalyst, such as sodium hydroxide, or more especially of an acidic catalyst or a Lewis acid such, for example, as sulfuric acid or boron trifluoride.

In the present process the acetal of the Formula II is treated with an epoxidizing agent. The epoxidation of the carbon-to-carbon double bond to the epoxide group in the compounds of the present process is carried out by a conventional method, preferably with the aid of an organic per-acid, such as peracetic, perbenzoic, peradipic, monoperphthalic acid or the like. Another suitable epoxidizing agent is hypochlorous acid; when this is used HOCl is added on to the double bond in a first stage, whereupon in a second stage the epoxide group is formed, under the action of an agent capable of splitting off hydrogen chloride, for example a strong alkali.

Owing to side-reactions the epoxidation may be accompanied by formation of hydrolyzed epoxides, that is to say compounds in which the epoxide group of the monoepoxide of the Formula I has been hydrolyzed to hydroxyl groups.

It has now been found that the presence of such by-products has as a rule a favourable effect upon the technical properties of the cured epoxides. In general, it is therefore of advantage not to isolate the pure monoepoxide from the reaction mixture.

Particularly readily accessible are, for example, the monoepoxides of the formula (VI) 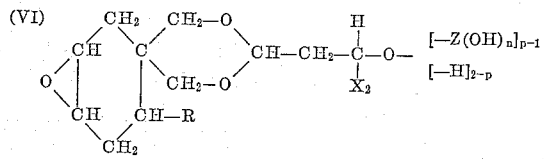

where R represents a hydrogen atom or a lower alkyl radical, $X_2$ a hydrogen atom or a methyl group, and $Z$, $n$ and $p$ have the same meanings as in the Formula I.

In general, the monoepoxides of the invention are clear liquids that are of low viscosity at room temperature. Surprisingly, and in contradistinction to known monoepoxides such as butylglycide, cresyl-glycide, styrene-oxide and the like, they can be cured or cross-linked by addition of a conventional curing agent for epoxy resins in the same manner as polyepoxides.

As such curing agents there may be used basic or more especially acidic compounds. The following have proved suitable: Amines and amides such as aliphatic and aromatic primary, secondary and tertiary amines, for example mono-, di- and tributylamines, para-phenylenediamine, bis-[para-aminophenyl]-methane, ethylenediamine, N:N-diethylethylenediamine, diethylenetriamine, tetra-[hydroxyethyl]-diethylenetriamine, triethylenetetramine, tetraethylenepentamine, N:N-dimethylpropylenediamine, trimethylamine, diethylamine, triethanolamine, Mannich's bases, piperidine, piperazine, guanidine and guanidine derivatives such as phenyldiguanidine, diphenylguanidine, dicyandiamide, formaldehyde resins with aniline, urea or melamine; polymers of aminostyrenes; polyamides, for example those of aliphatic polyamines with dimerized or trimerized unsaturated fatty acids; isocyanates, isothiocyanates; polyhydric phenols, for example resorcinol, hydroquinone, bis - [4 - hydroxyphenyl] - dimethylmethane, quinone; phenolaldehyde resins, oil-modified phenolaldehyde resins; reaction products of aluminium alcoholates or phenolates with tautomers of the type of acetoacetic acid ester; Friedel-Crafts catalysts such as aluminium trichloride, antimony pentachloride, tin tetrachloride, zinc dichloride, boron trifluoride and their complexes with organic compounds, metal fluoborates, phosphoric acid. Preferred curers are polybasic carboxylic acids and their anhydrides, for example phthalic anhydride, methylendomethylene tetrahydrophthalic anhydride, dodecenylsuccinic anhydride, tetrahydrophthalic anhydride, hexahydrophthalic anhydride, hexachloro-endo-methylene-tetrahydrophthalic anhydride or endomethylene-tetrahydrophthalic anhydride, or mixtures of said anhydrides; maleic or succinic anhydride. If desired, an accelerator, such as a tertiary amine or a strong Lewis base, for example an alkali metal alcoholate, and if desired also a polyhydroxy compound such as hexanetriol or glycerol, may be further added.

It has been found that it is of advantage to cure a monoepoxide of the invention with the use of a carboxylic acid anhydride in an amount of 0.3 to 1.3 gram equivalents of anhydride group for every gram equivalent of epoxide group. When a basic accelerator, such as an alkali metal alcoholate or an alkali metal salt of a carboxylic acid, is used, up to 1.5 gram equivalents of anhydride groups may be used.

The term "curing" as used in this context describes the conversion of said epoxide compounds into insoluble and infusible resins.

The most important sphere of application of the monoepoxides of the invention is their combined use with curable polyepoxide compounds or epoxy resins, more especially in the form of active diluents. The addition of a so-called active diluent is often desired in the use as casting or laminating resins or as solvent-free lacquers to obtain curable resin mixtures that are liquid at room temperature and have a minimum viscosity. The known active diluents for epoxy resins such, for example, as cresyl-glycide, have invariably the great disadvantage that they considerably impair the thermostability of the cured resins. It was extremely surprising to observe that the monoepoxides of the invention are outstandingly suitable as active diluents not only by virtue of their low viscosity but also because in general they actually accelerate the curing and the mechanical thermostability of the cured resin mixtures or, at worst, impair them only extremely little.

As diepoxides and polyepoxides to be used in conjunction with the monoepoxides of the invention there may be mentioned, for example, expodized diolefines, dienes or cyclic dienes such as butadiene dioxide, vinylcyclohexene dioxide, 1:2:5:6-diepoxyhexane and 1:2:4:5-diepoxycyclohexane; epoxidized, diolefinically unsaturated carboxylic acid esters such as methyl-9:10:12:13-diepoxystearate; the dimethyl ester of 6:7:10:11-diepoxyhexadecane-1:16-dicarboxylic acid; epoxidized compounds containing two cyclohexenyl radicals such as bis-[3:4-epoxy-cyclohexylmethyl]-succinate, bis-[3:4-epoxy-cyclohexylmethyl]-phthalate, diethylene glycol-bis-[3:4-epoxy-cyclohexane carboxylate], 3:4-epoxy-cyclohexylmethyl-3:4-epoxycyclohexane carboxylate and 3:4-epoxy-6-methyl-cyclohexylmethyl-3:4-epoxy-6-methylcyclohexane carboxylate. Furthermore basic polyepoxides such as are obtained by dehydrohalogenation of reaction products of primary or secondary amines, such as n-butylamine, aniline or 4:4'-di-[monomethyl-amino]-diphenylmethane, with epichlorohydrin.

Likewise suitable are polyglycidyl esters obtained by reacting a dicarboxylic acid with epichlorohydrin or dichlorohydrin in the presence of an alkali; such polyesters may be derived from aliphatic dicarboxylic acids such as oxalic, succinic, glutaric, adipic, pimelic, suberic, azelaic, sebacic acid or more especially from aromatic dicarboxylic acids such as phthalic, isophthalic, terephthalic, 2:6-naphthylenedicarboxylic, diphenylortho:ortho' - dicarboxylic acid, ethylene glycol-bis-[para-carboxyphenyl]-ether and the like. As examples there may be mentioned diglycidyl adipate and diglycidyl phthalate as well as diglycidyl esters of the average formula

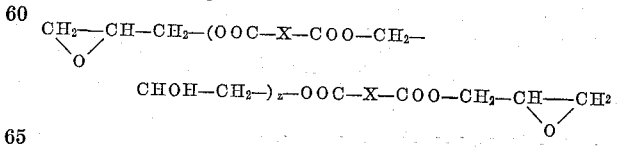

where X represents an aromatic hydrocarbon radical such as a phenylene radical, and $z$ is a small whole or fractional number, for example from 0 to 2.

Furthermore suitable are polyglycidyl ethers such as are obtained by etherifying a polyhydric alcohol or polyphenol with epichlorohydrin or dichlorohydrin in the presence of alkali; these compounds may be derived from glycols such as ethylene glycol, diethylene glycol, triethylene glycol, propylene, glycol-1:2, propylene glycol-1:3, butylene glycol-1:4, pentanediol-1:5, hexanediol-1:6, hexanetriol-2:4:6, glycerol or from polyphenol such as phenol or cresol novolaks, resorcinol, pyrocatechol, hydroquinone, 1:4-dihydroxynaphthalene, bis-[4-hydroxyphenyl]-methane, bis-[4-hydroxyphenyl]-methylphenylmethane, bis-[4-hydroxyphenyl]-tolylmethane, 4:4'-dihydroxydiphenyl, bis-[4-hydroxyphenyl]-sulfone and more especially from 2:2-bis-[4-hydroxyphenyl]-propane (bisphenol). There may be mentioned ethylene glycol diglycidyl ethers and resorcinol diglycidyl ethers as well as diglycidyl ethers corresponding to the average formula

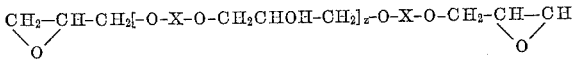

where X represents an aromatic hydrocarbon radical such as the phenylene radical, or the hydrocarbon radical of bisphenol, and z is a small whole or fractional number, for example from 0 to 2.

Accordingly, the present invention provides also curable mixtures containing a monoepoxide of the invention, preferably in conjunction with a diepoxide or polyepoxide compound, as well as a curing agent for epoxy resins, preferably an anhydride of a dicarboxylic or polycarboxylic acid.

The monoepoxide compounds of the invention, and their mixtures with polyepoxide compounds and/or curing agents may be admixed at any stage prior to the curing operation with fillers, plasticizers, coloring matter or the like. Suitable extenders and fillers are, for example, asphalt, bitumen, glass fibers, mica, quartz meal, cellulose, kaolin, finely divided silicic acid (Aerosil) or metal powders.

The mixture of the new monoepoxides, polyepoxides and/or curers may be used, with or without fillers, if desired in the form of solutions or emulsions as textile assistants, laminating resins, paints, varnishes, dipping or casting resins, coating compositions, pore fillers and putties, adhesives, moulding compositions and the like, as well as for the manufacture of such products. The new resins are particularly valuable as insulating compounds for the electrical industry.

In the following examples parts and percentages are by weight, and the relationship between part by weight and part by volume is the same as that between the kilogram and the liter. The data relating to epoxide equivalents per kg. were determined by the method described by A. J. Durbetaki in "Analytical Chemistry," volume 28, No. 12, December 1956, pages 2000–2001, with hydrogen bromide in glacial acetic acid.

EXAMPLE 1

(a) *Acetal From Acrolein and 1:1-Bis-[Hydroxymethyl]-Cyclohexene-3*

A mixture of 118 parts of acrolein, 286 parts of 1:1-bis-[hydroxymethyl]-cyclohexene-3 and 3 parts by volume of sulfuric acid of 50% strength is heated for 20 minutes at 50° C. When all has dissolved, 700 parts by volume of benzene and 2 parts of para-toluenesulfonic acid are added and the whole is boiled for 40 minutes in a cyclic distillation apparatus until 40 parts of water have distilled azeotropically. The solution is mixed with 4 parts of anhydrous sodium carbonate, filtered and evaporated. When the benzene has been expelled, 319 parts of the acetal [3-vinyl-2:4-dioxo-spiro(5:5)-undecene-9] pass over at 54–61° C. under a vacuum of 0.2 mm. Hg, corresponding to a yield of 87% of the theoretical. 40 parts of a residue were left which was not identified.

(b) *Additive Combination With Water*

A mixture of 135 parts of the acetal described above (3-vinyl-2:4-dioxospiro(5:5)-undecene-9), 20.5 parts of water and 4 parts of sulfuric acid of 80% strength is heated with stirring to a gentle boil. In the course of 3 hours the reaction temperature rises gradually from 85 to 92° C. The sulfuric acid is then neutralized with 5 parts of sodium carbonate and the reaction mixture is distilled. At first 10.5 parts of water and then 20 parts of unreacted acetal pass over; afterwards 23 parts of unsaturated alcohol (3-hydroxyethyl-2:4-dioxospiro(5:5)-undecene-9) pass over at 107° C. under a pressure of 0.15 mm. Hg. The residue remaining in the flask consists of 114 parts of the adduct of 2 molecular proportions of acetal with 1 molecular proportion of water.

(c) *Epoxidation*

47 parts of the above 3-hydroxyethyl-2:4-dioxospiro (5:5)-undecene-9 are dissolved in 90 parts of benzene and mixed with 37 parts of anhydrous sodium carbonate. While stirring and cooling at 23–25° C. 46 parts of peracetic acid of 43.2% strength are then added dropwise within 40 minutes. The temperature is then maintained for 6 hours at 23–25° C., after which the theoretical amount of peracetic acid is consumed. The precipitated salt is filtered off, washed with benzene and the benzene is distilled off under a gradually raised vacuum from the combined filtrates. The last traces of solvent are removed in a high vacuum of 0.15 mm. Hg at an internal temperature of 90° C. As residue there are left 41 parts of a colorless, mobile liquid which is water-soluble and contains 2.9 epoxide equivalents per kg.; it consists substantially of the monoepoxide of the formula

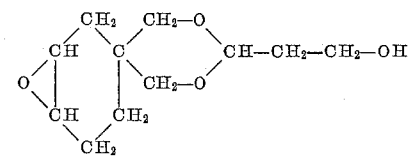

EXAMPLE 2

A mixture of 630 parts of the acetal described in Example 1(a), 434 parts of ethylene glycol and 4 parts of para-toluenesulfonic acid is heated for 90 minutes at 90° C., then cooled, the acid is neutralized with 5 parts of anhydrous sodium carbonate, and the reaction product is subjected to fractional distillation. There are obtained:

260 parts of unreacted ethylene glycol passing over at 52–94° C. under 0.15 mm. Hg pressure, 500 parts of unsaturated alcohol (3-hydroxyethoxyethyl-2:4-dioxospiro(5:5)-undecene-9) passing over at 125–130° C. under 0.15 mm. Hg pressure, and 230 parts of an adduct of 2 molecular proportions of acetal with 1 molecular proportion of ethylene glycol as residue.

The resulting unsaturated alcohol is epoxidized in the following manner:

190 parts of the above-mentioned 3-hydroxyethoxyethyl-2:4-dioxospiro(5:5)-undecene-9 are mixed with 300 parts of benzene and 125 parts of anhydrous sodium carbonate and, while stirring and cooling at 23–25° C., 150 parts of peracetic acid of 43.2% strength are added dropwise within 1 hour. The mixture is stirred for 12 hours longer at the same temperature, after which the theoretical amount of peracetic acid is consumed. The precipitated salt is filtered off, washed with benzene and the solvent is distilled out of the combined filtrates, the removal of the last remnants of benzene being carried out in a high vacuum. As residue there are obtained 191 parts of a water-soluble colorless liquid of low viscosity which contains 2.83 epoxide equivalents per kg. (=73% of the theoretical content) and consists substantially of the monoepoxide (Compound A) of the formula

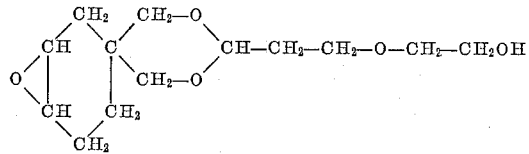

EXAMPLE 3

A mixture of 440 parts of the acetal described in Example 1(a), 450 parts of butanediol-1:4 and 3.5 parts of para-toluenesulfonic acid is heated for 2 hours at 90° C., then cooled, and neutralized with 5 parts of anhydrous sodium carbonate. The reaction product is then subjected to fractional distillation; at first the excess butanediol passes over, followed at 165° C. under 0.3 mm. Hg pressure by 460 parts of unsaturated alcohol (3-hydroxy-butoxyethyl-2:4-dioxospiro(5:5)-undecene-9). The residue, 172 parts, consists substantially of the adduct of 2 molecular proportions of acetal with 1 molecular proportion of butanediol.

The unsaturated alcohol is epoxidized in the following manner: 440 parts of the above-mentioned 3-hydroxy-butoxyethyl-2:4-dioxospiro(5:5)-undecene-9 are mixed with 720 parts of benzene and 253 parts of anhydrous sodium carbonate. While stirring and cooling at 23–25° C., 316 parts of peracetic acid of 43.2% strength are then added dropwise within 1 hour and 45 minutes, and the mixture is stirred on for 12 hours at the same temperature, by which time 102% of the theoretical amount of peracetic acid have been consumed. The salt is filtered off, washed with benzene, and the solvent is expelled from the combined filtrates, towards the end at an internal temperature of 113° C. and under a vacuum of 0.2 mm. Hg. There remain 432 parts of a colorless liquid which is substantially water-soluble and contains 2.48 epoxide equivalents per kg. It consists substantially of the monoepoxide of the formula

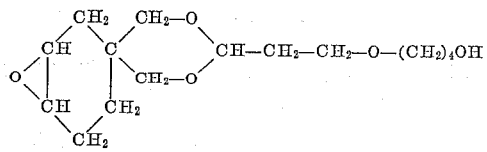

EXAMPLE 4

A mixture of 540 parts of the acetal described in Example 1(a), 552 parts of glycerol and 4 parts of para-toluenesulfonic acid is heated for 90 minutes at 90° C. The acid is then neutralized with 6 parts of anhydrous sodium carbonate, and the mixture is distilled. At 120° C. under 0.25 mm. Hg, 350 parts of unreacted glycerol pass over, to leave behind 724 parts of a viscous residue consisting substantially of the following two compounds:

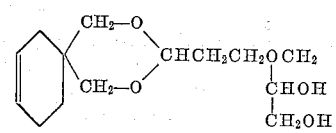

and

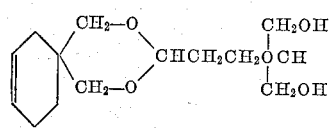

This mixture is epoxidized in the following manner:

A solution of 710 parts of the mixture in 1500 parts of benzene is treated with 412 parts of anhydrous sodium carbonate. While stirring the mixture thoroughly it is then treated within 100 minutes with 503 parts of peracetic acid of 43.2% strength, while maintaining the temperature at 23–25° C. by cooling. When all the peracetic acid has been added, the mixture is stirred on for 12 hours. Finally, after concentration, there are obtained 654 parts of a highly viscous monoepoxide mixture containing 2.28 epoxide equivalents per kg. and consisting substantially of the compounds of the formulae

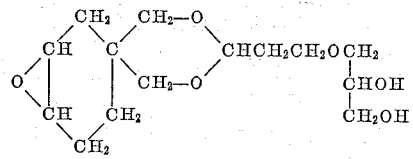

and

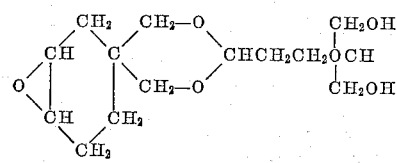

EXAMPLE 5

A mixture of 225 parts of the acetal described in Example 1(a), 239 parts of sorbitol and 1 part of sulfuric acid of 80% strength is heated to 80° C. while being vigorously stirred. The mixture, which at the start consists of two phases, gradually becomes homogeneous and after 3 hours it forms a single layer consisting of a highly viscous product which is epoxidized in the following manner:

430 parts of the unsaturated alcohol obtained by adding 1 molecular proportion of acetal on to 1 molecular proportion of sorbitol are dissolved in 700 parts of isopropanol and, while being vigorously stirred, the solution is treated with 200 parts of anhydrous sodium carbonate. 242 parts of peracetic acid of 43.2% strength are then vigorously stirred in within 70 minutes, while maintaining the temperature at 23–25° C. by cooling. After 15 hours 101% of the theoretical amount of peracetic acid have undergone reaction. The precipitated salt is then filtered off and washed with isopropanol. Concentration of the combined filtrates finally yields 385 parts of a highly viscous, completely water-soluble product containing 2.4 epoxide equivalents per kg.; it consists substantially of a mixture of isomeric monoepoxides of the formula

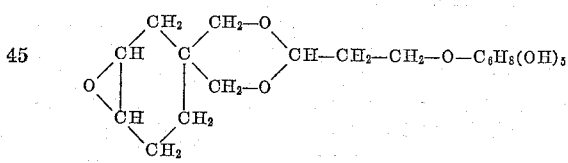

EXAMPLE 6

In a first experiment 100 parts of a liquid polyglycidyl ether resin (Compound A), containing 5.3 epoxide equivalents per kg., are prepared by reacting epichlorohydrin upon bis-(4-hydroxyphenyl)-di-methyl-methane in the presence of alkali; in a second experiment a mixture is prepared from 100 parts of Compound A and 10 parts of cresylglycidyl ether, containing 5.55 epoxide equivalents per kg., by reacting ortho-cresol upon epichlorohydrin in the presence of alkali; in a third experiment a mixture is prepared from 100 parts of Compound A and 50 parts of an epoxy alcohol of the formula

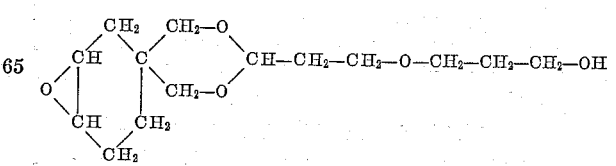

prepared as described in Example 2, containing 2.57 epoxide equivalents per kg., and each mixture is melted at 120° C. with 0.85 equivalent of phthalic anhydride per equivalent epoxide as curing agent.

Round tins of 60 mm. diameter and 40 mm. height are filled each with 100 grams of the resulting resin+curer mixtures and the jelling times are ascertained in an oven heated at 120° C.

Another portion of the resin+curer mixtures is poured into aluminium tubes (40 x 10 x 140 m.) and all tubes are cured for 1 hour and 24 hours respectively. The viscosities so ascertained are listed in the following table:

SPECIMEN

| | | | |
|---|---|---|---|
| Viscosity of epoxy resin mixture at 25° C. in centipoises | 11,000 | 3,000 | 3,000 |
| Jelling time of a 100 g.-specimen of the epoxy resin+curer mixture in an oven heated at 120° C., in minutes | 150 | 183 | 25 |
| Impact bending strength cm.-kg./cm.² after curing at 140° C. for— | | | |
| 1 hour | not cured | | 11.0 |
| 24 hours | 8.5 | 9.0 | 9.3 |
| Bending strength kg./mm.² after curing at 140° C. for— | | | |
| 1 hour | not cured | | 13.5 |
| 24 hours | 15.9 | 15.5 | 11.7 |

Another portion of the afore-mentioned epoxy resin+curer mixtures is used for cementing tests. For this purpose there are used strips (170 x 25 x 1.5 mm.; overlap 10 mm.) of ground and degreased aluminium marketed under the trademark "Anticorodal B" and the cemented strips are cured for 1 hour and 24 hours respectively at 140° C.

| Curing time at 140° C. | Tensile shear strength, kg./mm.² | | |
|---|---|---|---|
| | Test 1 | Test 2 | Test 3 |
| 1 hour | delaminated | delaminated | 1.3 |
| 24 hours | 1.6 | 1.65 | 1.60 |

What is claimed is:

1. A monoepoxide of the formula

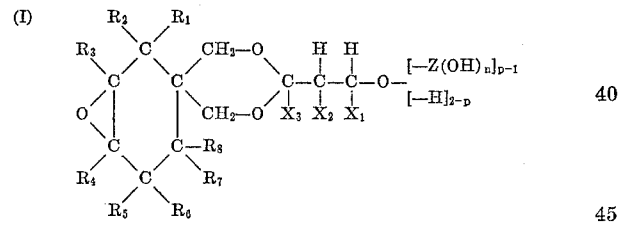

wherein $R_1$ and $R_5$ are selected from the group consisting of hydrogen, halogen, lower alkyl of 1 to 4 carbon atoms and together $R_1$ and $R_5$ form the methylene group, $R_2$, $R_3$, $R_4$, $R_6$, $R_7$ and $R_8$ each represents a member selected from the class consisting of hydrogen, halogen and lower alkyl of 1 to 4 carbon atoms, $X_1$ and $X_2$ each is a member of the class consisting of hydrogen and methyl, $X_3$ represents a member of the class consisting of hydrogen and alkyl of 1 to 4 carbon atoms, Z is the hydrocarbon radical of an aliphatic saturated polyhydric alcohol, $n$ is an integer of 1 to 5 and $p$ is an integer of at least 1 and at the most 2.

2. The monoepoxide of the formula

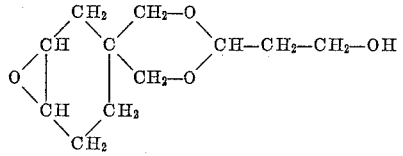

3. The monoepoxide of the formula

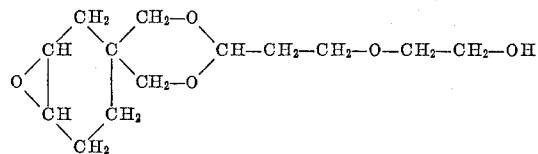

4. The monoepoxide of the formula

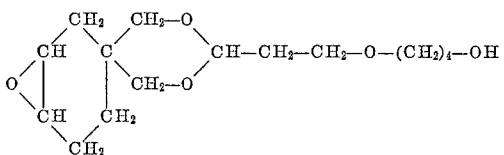

5. A monoepoxide of the formula

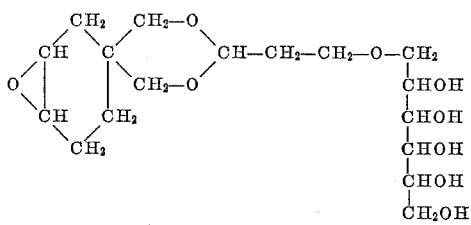

6. A monoepoxide of the formula

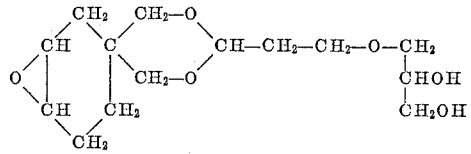

7. A monoepoxide of the formula

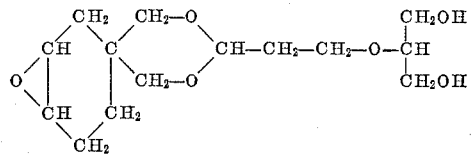

No references cited.